April 24, 1962   G. F. CROESSANT   3,031,098
TOOL FOR INSTALLING SCREW ANCHORS
Filed Nov. 7, 1957   2 Sheets-Sheet 1

INVENTOR.
George Frederick Croessant.
BY
William J. Ruano
ATTORNEY.

April 24, 1962     G. F. CROESSANT     3,031,098
TOOL FOR INSTALLING SCREW ANCHORS Filed Nov. 7, 1957     2 Sheets-Sheet 2

INVENTOR.
George Frederick Croessant.
BY
William J. Ruano
ATTORNEY.

United States Patent Office 3,031,098
Patented Apr. 24, 1962

3,031,098
TOOL FOR INSTALLING SCREW ANCHORS
George Frederick Croessant, Temple, Pa., assignor to Croessant Machine Works Inc., Temple, Pa.
Filed Nov. 7, 1957, Ser. No. 695,131
4 Claims. (Cl. 218—42)

This invention relates to a tool for installing screw anchors, and, more particularly, it relates to a tool for automatically unscrewing a pull rod from such screw anchors after the rod has been used for expanding the anchors into anchoring engagement inside a wall panel or the like.

The present tool is useful for installing screw anchors of the general type described in my Patent No. 2,559,281 dated July 3, 1951. The present tool is an improvement of that shown in my Patent No. 2,582,417 dated January 15, 1952.

An outstanding disadvantage of said last mentioned patented tool is that difficulty is experienced in installing large numbers of screw anchors since the tool or a screw driver must be used to unscrew its pull rod from each screw anchor for removing it and this consumes a considerable length of time; also it is time consuming and involves considerable time and effort to unscrew the pull rod in difficult-to-reach places, such as high ceilings etc.

An object of the present invention is to provide a tool which overcomes the disadvantages of the tool shown in my prior patent, also which enables expanding of the screw anchor and automatic unscrewing and removal of the pull rod by a single squeeze and release of the handles so as to make it possible to install large numbers of screw anchors in a very short period of time, thus greatly decreasing construction costs.

Another object of my invention is to provide a tool for speedily installing screw anchors of varying sizes, both in length and in diameter, by the use of the same tool with simple, easy to change adapters, thereby considerably facilitating installation of such screw anchors.

Other objects and advantages of my invention will become apparent from a study of the following description taken with the accompanying drawings, wherein.

Figure 1:
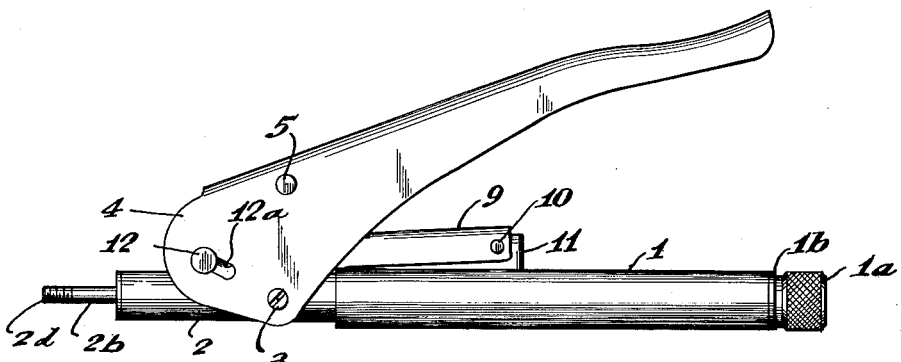
FIGURE 1 is a side elevational view of a tool for installing screw anchors and embodying the principles of my invention.
Figure 2:
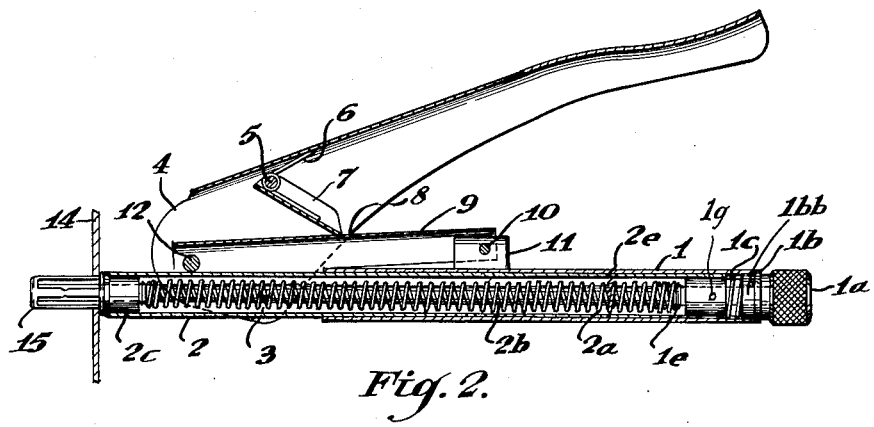
FIGURE 2 is a vertical cross-sectional view of the tool shown in FIG. 1 and showing the parts in the initial position before expanding screw anchor 15.
Figure 3:
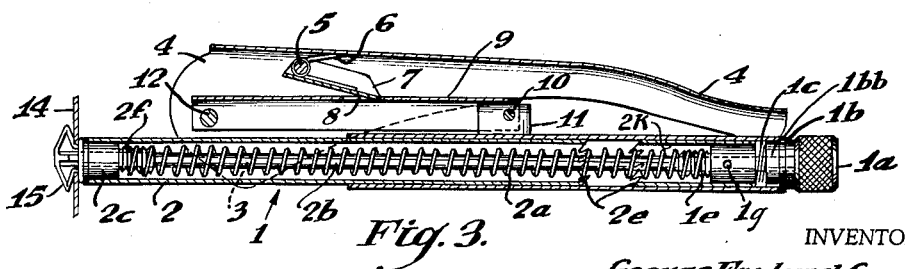
FIGURE 3 is a view similar to FIG. 2 except that it shows the parts of the tool in the position after expanding screw anchor 15.

Referring more particularly to FIGS. 1, 2 and 3 of the drawing, numeral 1 denotes a hollow tube into which is telescopically fitted a hollow tube 2. Tubes 1 and 2 may be made of any suitable metal, such as aluminum, steel or steel alloys, or of other suitable material. Tube 2 may be moved or slid longitudinally outwardly and forwardly relative to tube 1 by pushing down a handle 4 which is pivotally connected to tube 2 by means of studs 3 screwed into diametrically opposite sides of tube 2. Pivotally mounted on a stud 5, extending through the U-shaped cross-section of handle 4, is a handle retracting element 7 of substantially U-shaped cross section which is spring biased by means of a substantially hairpin shaped, handle retracting spring 6, the central portion of which spring is wrapped one turn about stud 5. The lower end of element 7 engages link 9 by pushing against the end of slot 8 formed therein.

Link 9 is loosely, pivotally connected, at one end, to handle 4 by means of a stud 12 and is pivotally connected at the other end, by means of the stud 10, to a projection 11 rigidly secured to tube 1 and having an inverted U-shaped cross-section. Stud 12 projects through a slot 12a in handle 4 to permit lateral angular movement of handle 4 relative to link 9. The ends of stud 10 have enlarged heads. The edge of slot 8 serves as a stop for the end of element 7, as shown more clearly in FIG. 3.

Thus as the workman grasps tube 1 with his fingers and handle 4 with his thumb and squeezes the handle toward tube 1, the handle assembly will change from the position shown in FIG. 2 to that shown in FIG. 3, whereby the tube 2 is pulled longitudinally outwardly, to an extent, of tube 1. More specifically, as the handle 4 and tube 1 are squeezed together, the handle will pivotally turn about studs 3 while the stud 12 will move downwardly of slot 12a, and at the same time the element 7 will be turned slightly counter clockwise against the action of return spring 6 about the end of slot 8 as a pivot and handle 4 will be moved very closely to tube 1 as shown in FIG. 3.

An important feature of the present invention resides in a spring means for automatically unscrewing a detachable pull rod from the screw anchor, after winding of the spring and expansion of the screw anchor thereby. As more clearly shown in FIGS. 4, 5 and 5A, such spring winding means comprises a helical spring 2a having one end rigidly secured to a plug 2c integral with a hub portion 2f having helical grooves on its outer surface. The hub serves as a fixed seat for the end turns of the spring 2a. Plug 2c is tightly fitted in or soldered to the end of tube 2 so as to rigidly hold the hub portion 2f in fixed position. The other end of spring 2a is wound onto a similar helically threaded hub 1e integrally formed on a plug 1b having an integral collar 1bb longitudinally slidable inside the end of tube or sleeve 2k when a knurled knob 1a, detachably coupled thereto, is pushed forwardly. More specifically, knob 1a has a pin 1f which fits into a corresponding hole 1gg in the end face of plug 1b. Hub 1e has a radial pin 1g which fits into a slot 1ff formed in an encircling sleeve 2k to prevent relative rotation therebetween. Sleeve 2k is yieldably biased to the left, as viewed in FIGS. 4 and 5A, by means of a helical compressing spring 1c located between the collar 1bb of plug 1b and the end of sleeve 2k, as shown more clearly in FIGS. 4 and 5A.

Figure 4:
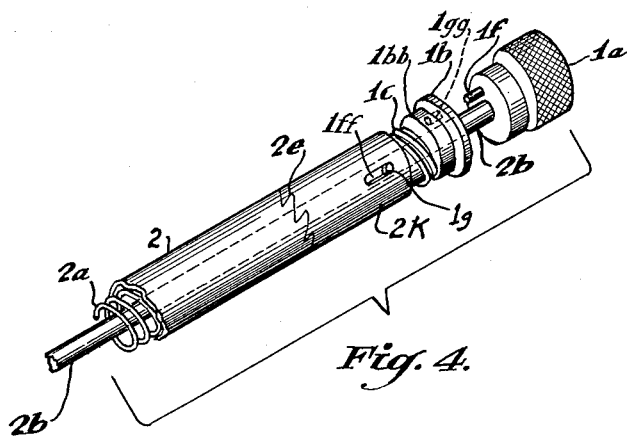
FIGURE 4 is a fragmentary, perspective view of the spring-winding, rear end portion of the tool shown in FIGS. 1 to 3.

One end of sleeve 2k has ratchet teeth 2e which are adapted to engage correspondingly shaped ratchet teeth 2e formed in the end of tube 2, as shown more clearly in FIG. 4. Pin 1f, integrally formed on the inner face of knurled knob 1a, is projected into the hole 1gg formed in plug 1b. Then upon turning of knob 1a in a clockwise direction, plug 1b and hub 1e will both turn and will effect turning and winding of the rear end of the spring 2a while the forward end is held in fixed position on hub 2f. While so winding the spring, sleeve 2k will rotate by virtue of the pin 1g and slot 1ff connection, and ratchet teeth 23 of sleeve 2k will slip by those of tube 2 while spring 1c is compressed so as to normally urge the ratchet teeth 2e of sleeve 2k into full engagement with teeth 2e of tube 2 after each slip of the set of teeth 2e of sleeve 2k past the corresponding set on tube 2. Of course, sleeve 2k cannot turn counterclockwise because of the shape of the two sets of ratchet teeth. Thus, by rotating the knurled knob 1a a larger number of turns, the spring 2a is wound to a greater extent.

In operation, assume that knob 1a has been grasped and turned a sufficient number of times to wind spring 2a while the tool handle is in the position shown in FIG. 1, and that a screw anchor 15 is thereafter manually screwed onto the end of rod 2b, as shown in FIG. 2, and pushed by the tool through a hole formed in wall panel 14. Handle 4 is then grasped and pulled toward tube 1 from the position shown in FIGS. 1 and 2 to that shown in FIG. 3, whereupon tube 2 is slid relatively longitudinally outwardly and forwardly of tube 1 and rod 2b, an amount sufficient to expand the screw anchor, as shown in FIG. 3, and to anchor its teeth to panel 14 to prevent rotation of the screw anchor relative to the panel. This relative forward movement causes the ratchet teeth 2e of tube 2 and sleeve 2k to disengage, as shown more clearly in FIG. 3. However, the spring 2a will not unwind yet because of the frictional resistance provided by the screw anchor against relative rotation between it and rod 2b. But upon initial release of handle 4, and subsequent retraction of the spring 2a, such spring will very rapidly unwind and rotate sleeve 2k in a counterclockwise direction. In so doing, it will, in its initial rotation, also rotate the knurled knob 1a, coupled to knob 1b, together with the rod 2b, integrally secured to the knob 1a, whereupon the threaded end portion 2d of the rod will become quickly unscrewed from the threaded collar portion of the screw anchor, since the head of the screw anchor is anchored to the wall. Thereafter, the tool may be removed. As knob 1a is turned counterclockwise by the unwinding spring 2a, it will slide longitudinally to uncouple pin 1f from plug 1b so as to allow the rod 2b to turn more freely to assure unscrewing of its threaded end from the collar of the screw anchor. Thus rod 2b may turn several times more turns than plug 1b since it has less inertia and friction in its bearing surfaces than the relatively rotatable parts of the assembly coupled to plug 1b. Ball 2h, urged radially outwardly by spring 2j, engages against the inner end surface of hub 1e to act as a limit stop to limit the extent of longitudinally outward movement of knob 1a and rod 2b after uncoupling of pin 1f from hole 1gg.

The tool is then moved to the position in which the next screw anchor is to be installed, and the operation described above is repeated.

Figure 6:
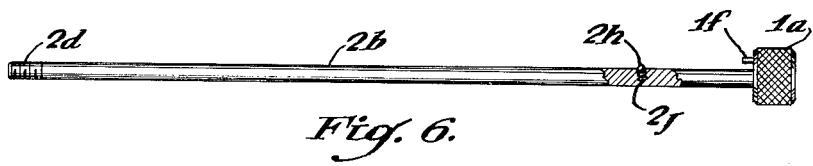
FIGURE 6 shows one of the rods which slides into the tool shown in FIGS. 1 to 3 and which serves as a pull rod for a particular size of screw anchor.
Figure 7:
FIGURE 7 is another pull rod of different length than that shown in FIG. 6 for accommodating a longer screw anchor.

A unique feature of the present invention is that the tool is so constructed as to accommodate different sizes of screw anchors, that is, screw anchors having different lengths, as well as those having different diameters. This is accomplished by providing pull rods or adapters, such as shown in FIGS. 6 and 7, of different lengths, as well as of different diameters. As will be noted in FIGS. 1 and 2, the length of the screw anchor corresponds substantially to the distance between the left end portion of tube 2 and the threaded rod end 2d. If the amount of extension of pull rod end portion 2b is not sufficiently long to accommodate the desired size of screw anchor a longer rod is used, such as the one in FIG. 7 as compared to the one shown in FIG. 6. The rods may be provided with a ball bearing 2h urged outwardly by spring 2j also to provide a tight fit. Also, the rods may be made of different diameters to accommodate different diameters of the threaded collar portion of the screw anchor.

Figures 5, 5A:
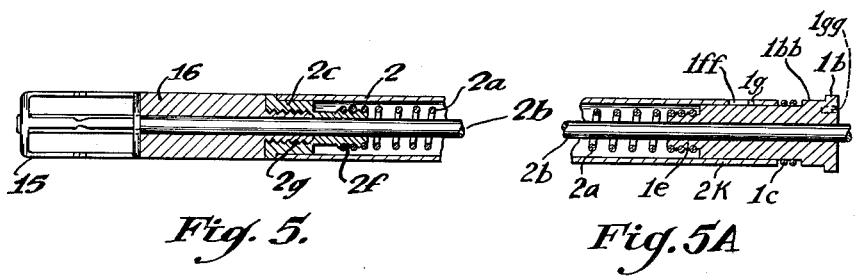
FIGURE 5 is a fragmentary, longitudinal cross-sectional view of the forward end of the tool, including an adapter for holding screw anchors of short length in place before installation.
FIGURE 5A is a longitudinal, cross-sectional view of the rear end portion of the tool shown in FIGURE 4.

In the case of screw anchors of very short length, known in the trade by the trademark "Jack Nut," it is necessary to add an additional extension 16, as shown in FIG. 5, which is essentially a plug or adapter having a threaded collar portion 2g of reduced diameter which is screw threaded into the internally threaded end portion of plug 2c.

Thus by having a variety of lengths of adapters, such as 16, and a variety of lengths, as well as diameters, of rods such as those shown in FIGS. 6 and 7, a very large variety of sizes of screw anchors may be installed by the use of a single tool such as described hereinabove.

Thus it will be seen that I have provided a highly efficient tool which is useful for easily and quickly installing screw anchors at a high rate of speed and for facilitating installation of such screw anchors in places which are difficult to reach, such as high ceilings and the like; furthermore I have provided a tool for installing screw anchors, which tool is substantially automatic in operation, permitting rapid expansion of the screw anchor and unscrewing of the tool therefrom upon release of squeezing movement of the handle of the tool; furthermore I have provided a tool of relatively simple and inexpensive construction, which is easy to operate, and which is adjustable, by means of rods or adapters, to accommodate widely varying sizes of screw anchors, both in length and diameter, so that a single tool is all that is necessary for installations of all sizes of screw anchors.

While I have illustrated and described a single specific embodiment of my invention, it will be understood that this is by way of illustration only, and that various changes and modifications may be made within the contemplation of my invention and within the scope of the following claims.

I claim:

1. A tool for automatically installing a screw anchor, comprising a pair of telescoping tubes, a handle pivotally connected to said tubes so as to effect longitudinally outward movement of one tube relative the other, a helical spring enclosed in said tubes and having one end fixed with respect to the forward end of the inside tube, a knob rotatably mounted on the rear end of the outside tube and having an integral rod extending axially through said tubes and spring, said rod having a threaded end projecting through an end of said inside tube, said knob being detachably connected with respect to the rear end of said spring so as to permit initial winding of said spring upon manual rotation of the knob, said screw anchor being screwable onto said threaded end and expandable in response to squeezing together of said handle and tubes, and means responsive to subsequent release of said handle for permitting unwinding said spring and thereby automatically unscrewing said rod from said screw anchor to permit removal of said tool.

2. A tool for automatically installing a screw anchor, comprising a pair of telescoping, hollow cylindrical tubes, a handle pivotally connected to said tubes so as to effect relative longitudinal movement therebetween, a hollow cylindrical plug fixed to one end of one of said tubes and a hollow cylindrical plug rotatably mounted on the other end of the other said tubes, the opposite end of said one of said tubes having ratchet teeth, a tubular element shiftably connected to said rotatable cylindrical plug and having ratchet teeth corresponding to said first mentioned ratchet teeth and engageable therewith, a helical spring concentrically mounted inside said tubes and having opposite ends connected to said respective plugs, a knob detachably fastened to said rotatable plug and having a rod extending through said helical spring along the axes of said tubes, said rod having a threaded end portion projecting beyond the end of one of said tubes, whereby upon initial rotation of said knob, said ratchet teeth will engage and said spring will be wound up, and upon screwing of a screw anchor onto said threaded end portion of the rod and initial squeezing movement together of said handle and tubes, said ratchet teeth will disengage and said screw anchor will be collapsed, and upon slight release movement of said handle and tubes said spring will unwind and rotate said threaded end of the rod so as to automatically unscrew it from the screw anchor.

3. A tool as recited in claim 2 wherein said rod includes a stop element for limiting longitudinal outward movement of said knob sufficient to uncouple it from said plug, whereby the rod may be unscrewed a larger number of times, by its smaller inertia, than said rotatable plug to assure complete unscrewing of said rod from said screw anchor.

4. A tool for installing a screw anchor, comprising two relatively longitudinally slidable telescoping tubular elements, handle means for effecting longitudinal sliding movement of said elements, a rod extending along the longitudinal axes of said elements and having a screw threaded end adapted to be rotated in one direction and screwed into a screw anchor for expanding the anchor by operation of said handle means, a spring extending longitudinally inside said elements and wound about said rod, means at one end of said elements for manually winding said spring, and means including said spring responsive to release of said handle means, after said longitudinal sliding movement and expansion of said anchor, to effect rotation of said rod in an opposite direction and unwinding of said spring which, in turn, effects unscrewing of said rod from the expanded anchor.

References Cited in the file of this patent

UNITED STATES PATENTS

| | | |
|---|---|---|
| 2,069,907 | Waner | Feb. 9, 1937 |
| 2,566,683 | Thompson | Sept. 4, 1951 |
| 2,582,417 | Croessant | Jan. 15, 1952 |